Dec. 15, 1953

G. A. KAEBNICK ET AL 2,662,467

MACHINE FOR WRAPPING TIRE BEADS

Filed Jan. 11, 1950

INVENTORS
Gustav A. Kaebnick
R. Dale Parr
James L. Otstot
by Chas. W. Hull
Attorney Dec. 15, 1953
G. A. KAEBNICK ET AL
2,662,467
MACHINE FOR WRAPPING TIRE BEADS
Filed Jan. 11, 1950
2 Sheets-Sheet 2
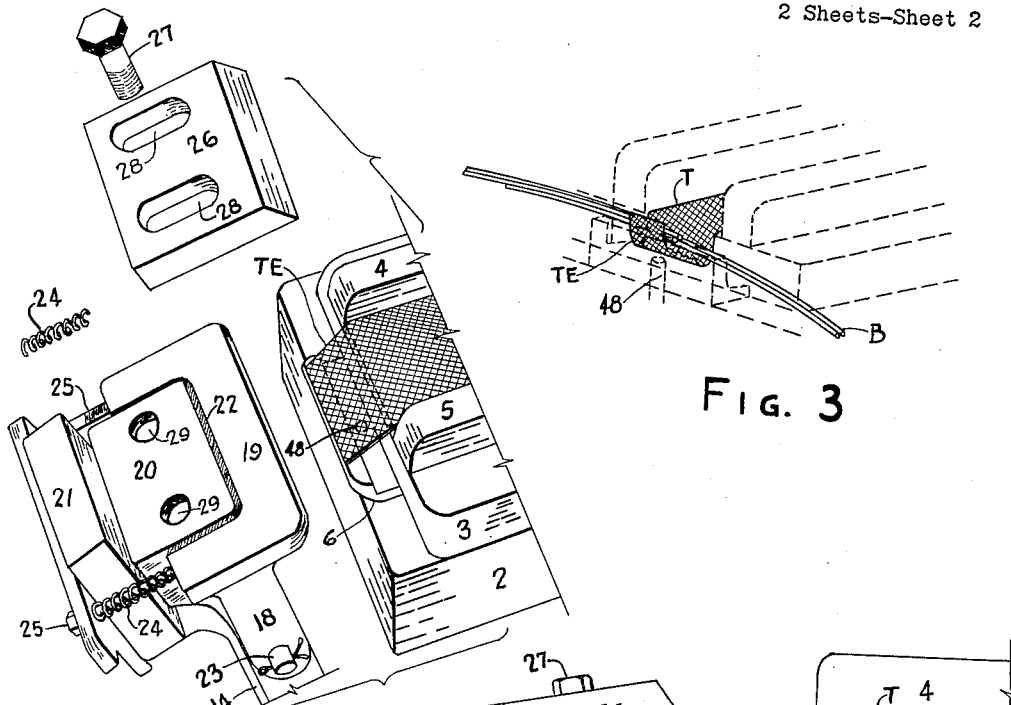
FIG. 2
FIG. 3
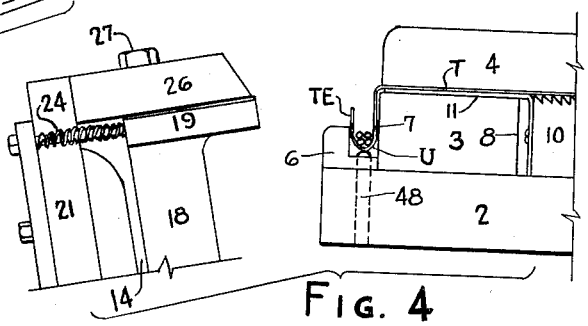
FIG. 4
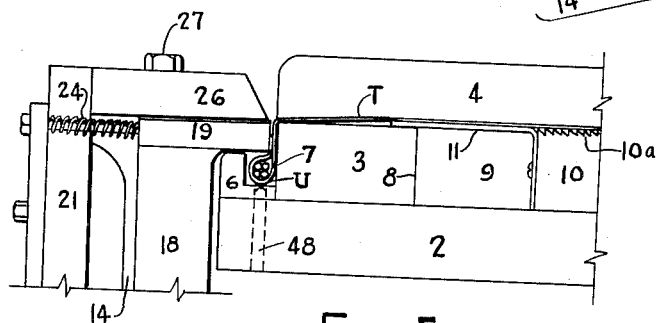
FIG. 5
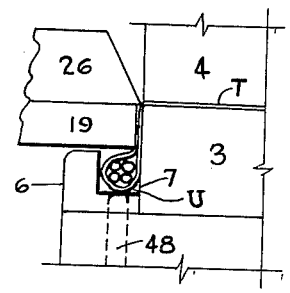
FIG. 6
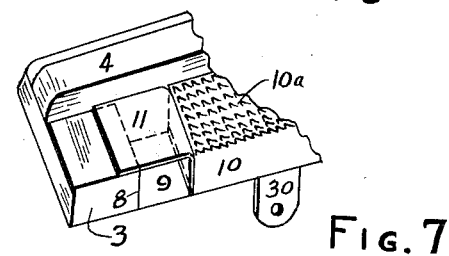
FIG. 7
INVENTORS
Gustav A. Kaebnick
R. Dale Parr
James L. Otstot
by Chas W Hull
Attorney.

Patented Dec. 15, 1953

2,662,467

UNITED STATES PATENT OFFICE 2,662,467

MACHINE FOR WRAPPING TIRE BEADS

Gustav A. Kaebnick, Russel Dale Parr, and James L. Otstot, Carlisle, Pa., assignors to Carlisle Corporation, Carlisle, Pa., a corporation of Delaware Application January 11, 1950, Serial No. 137,962

21 Claims. (Cl. 100—4)

This invention relates to tire beads and, more particularly, to a machine and method for folding or wrapping tape about the lapped portion of an annular tire bead. In the manufacture of pneumatic tires, it is customary to employ an annular bead made of several wires coated with rubber. In existing practice, such coated wires are formed into an annulus or hoop with their free ends over-lapping. The application of tape to the free ends of the bead annulus is the subject of the present improved apparatus and method.

A primary object of the invention is to provide a machine and method for wrapping tape about a bead wherein the article to be worked on, such as the bead, incepts and completes the operation. A further object is to provide a machine and method wherein the application of the work to the machine by the hands of the operator incepts and completes the operation, without independent manual or pedal control.

Another object of the invention is the provision of means and methods for concurrently wrapping a bead with tape and cutting the tape from a roll after the bead is wrapped, and also for gripping and holding the tape in lapped condition while the tape is being sheared.

A still further object is to provide a novel means for feeding the tape so as to form a "bridge" with the tape, preparatory to shearing it in a length of approximately three-quarters of an inch. In connection with this object, a novel apron means for supporting the tape end is provided.

Another object is to provide reciprocating means for feeding and reciprocating means for cutting the tape, which are synchronized in operation through a common source. A further object is to provide a novel reciprocating tape-gripping and tape-cutting device, provided on a common carriage and adapted for movement relative to one another.

The present improvements are further designed to dispense with hand-wrapping of the tape, as has been the common practice. Moreover, the output of wrapped beads is about trebled in the same period of time. A fool proof machine, which assures safety to the operator, constitutes a further object.

In the drawings,

Fig. 2 is an enlarged exploded view, in perspective, of a portion of the machine, looking down upon the corresponding parts of Fig. 1, Fig. 3 is a partly phantom and partly full view of one step in the method, with tape end TE broken away.

Fig. 4 is an enlarged, full, side view of the parts shown in Figs. 2 and 3 (with wall 5 removed), after inception of the wrapping operation but before the completion thereof.

Fig. 5 is an enlarged view of the parts in Fig. 4, illustrating the position of those parts at completion of the wrapping operation, but prior to the shearing or cutting operation.

Fig. 6 is an enlarged fragmentary view of a portion of the parts in Fig. 5, illustrating the cutting operation of the tape.

Fig. 7 is a fragmentary perspective, with parts removed, of the reciprocating feed device with the projecting apron means.

Figure 1:
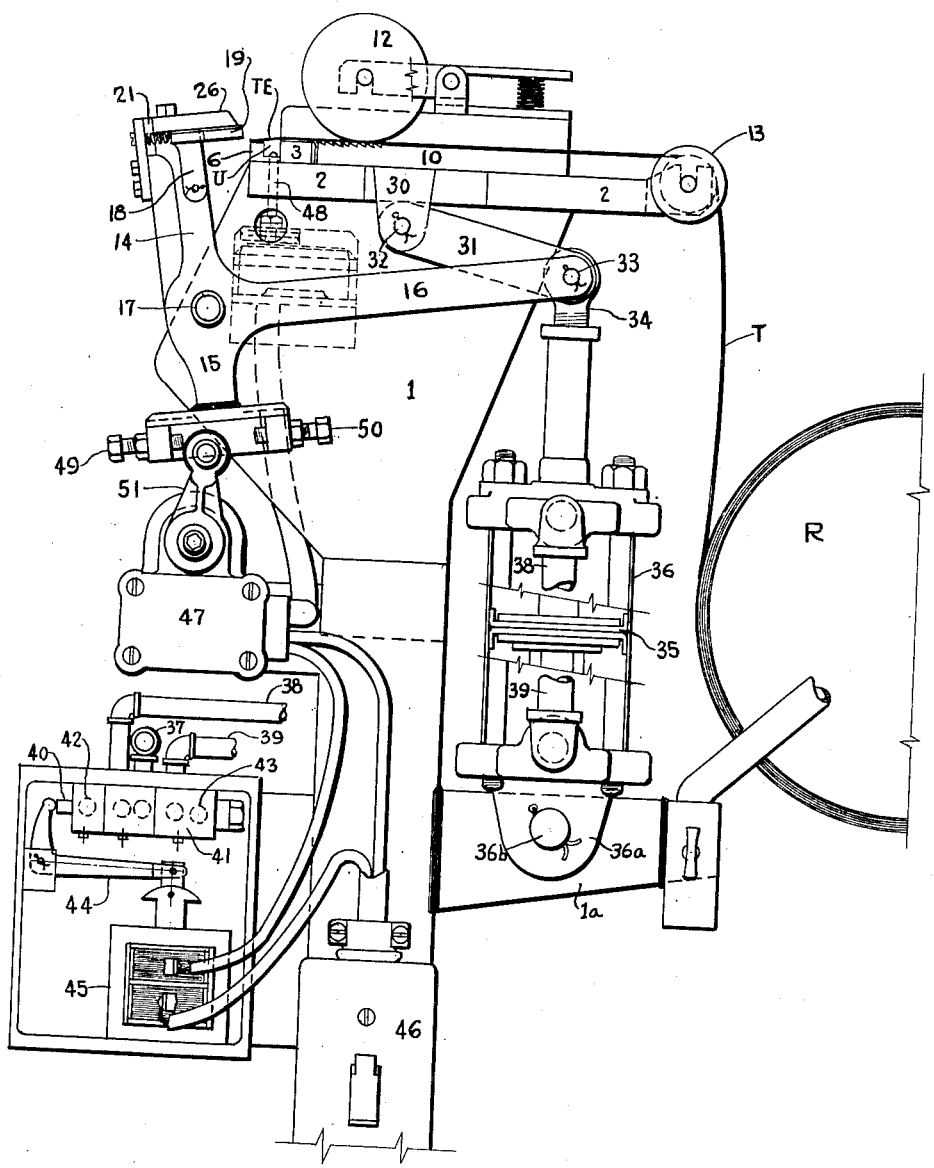
Fig. 1 is a side elevation of one embodiment of the improvements, with parts omitted or broken away for convenience in illustration.

Referring to the drawings, one embodiment of the invention is illustrated in side elevation in Fig. 1. For convenience in use and operative, the device is provided in compact form on a pedestal 1, the base of which is omitted for convenience in illustration. Certain of the parts are mounted directly on the pedestal 1, while others are disposed on brackets attached thereto.

A horizontal head 2 is mounted at the upper portion of the pedestal 1, which supports a channel-shaped tape guideway, comprising a fixed floor 3 and upstanding side walls 4 and 5. For convenience in illustration, wall 5 has been omitted from all views, except Figs. 2 and 3. An L-shaped member 6 is mounted on head 2, directly in front of the mouth of the aforesaid tape guideway, as illustrated in Fig. 2. As more clearly seen in other views, the vertical leg of this L-shaped member 6 terminates below the level of the channel floor 3, and the entire L-member 6 is anchored to head 2, so that it forms a U-shaped trough or mouth U, with vertical face 7 of floor 3. Accordingly, as hereinafter more fully described, when the tape T has been fed into position for wrapping, its free end portion TE is disposed over the U-shaped mouth or trough and forms a "bridge" between the front edge of floor 3 and the vertical leg of member 6. This position is clearly seen in Figs. 1 and 2.

As more clearly seen in Figs. 4 and 5, the fixed floor member 3 of the tape-guideway terminates in a rear face at 8, whereupon the head 2 and walls 4 and 5 cooperate to provide a slide-way 9, in which a carriage 10 and apron 11 reciprocate, as later described. The apron 11 is anchored to the front of carriage 10 and is designed to reciprocate upon the floor 3. The upper face of the forward portion of carriage 10 is provided with teeth 10a, and this surface and the apron 11, together with floor 3, provide a support for the tape T during feeding operation. A spring pressed idler roller 12 is disposed above the carriage 10 to cooperate with the toothed surface for gripping and feeding the tape.

As seen in Fig. 1, the tape T, which is of the so-called friction or adhesive type, is provided in a roll R, the free end of which is threaded over spool 13, across the toothed surface of carriage 10, over apron 11, and thence beyond floor 3 to provide the "bridge" or free end TE of the tape.

A bell crank lever having arms 14, 15 and 16 is pivoted to pedestal 1 at 17. The upper end portion of arm 14 serves as a carriage which accommodates a pivoted cradle 18, having a forwardly projecting lip or bar 19 for engaging and gripping free end TE of the tape, as later described. The upper end of arm 14 has a base 20, flanked on one side by up-standing member 21 anchored to arm 14. As seen in Fig. 2, there is a clearance 22 between base 20 and bar 19 of cradle 18, in order to permit relative movement therebetween, about the pivot 23 of cradle 18. However, the cradle and bar are held in the position illustrated in Fig. 2, by coil springs 24, surrounding adjustable guide bolts 25, the arrangement being such that movement of the bar 19 and cradle 18 is limited to the amount of clearance 22. Adjustment of the bolts 25 will vary the clearance 22, as desired.

As seen in Fig. 1, and in exploded Fig. 2, a knife or tape cutting member 26 is anchored to the base 20 of arm 14. This knife is fastened to arm 14 by a pair of threaded bolts 27 extending freely through slots 28 into threaded holes 29 in head 20. Only one bolt 27 is shown in Fig. 2 but it is understood that two are contemplated. The slots 28 are provided to permit adjustment of knife 26 relative to the cradle 18 and bar 19. In Figs. 1 and 4, these parts are shown in assembled, operative position. In Fig. 2, they have been exploded for clarity in description. In Figs. 1, 4 and 5, the relative position of the right hand edges of bar 19 and knife 26 are significant, as they will be referred to later in connection with the operation of the device.

Referring more particularly to Fig. 1, the carriage 10 has a depending ear 30, to which one end of arm 31 is pivotally attached at 32. The other end of arm 31, as well as arm 16, is pivotally attached at 33 to rod 34 of piston 35. This piston is reciprocated by air pressure in cylinder 36.

As seen in Fig. 1, the cylinder 36, has a depending ear 36a, pivotally mounted at 36b to bracket 1a of the pedestal 1. The rod 34, piston 35 and cylinder 36, as a unit, are, therefore, free to oscillate about 36b as a pivot.

A source of air pressure is provided through pipe 37 and is admitted above piston 35 through pipe 38 and below the piston by pipe 39. The valve control of this air pressure is conventional and, therefore, has not been illustrated in detail. However, for the purposes of a clear understanding of the invention, the spring pressed slide valve 40 is disposed in casing 41, which has vents 42 and 43.

In the position of Fig. 1, the valve permits communication through pipes 37 and 39 while pipe 38 and vent 42 are in communication. When held to the right hand position (as later described), pipes 37 and 38 are in communication, and pipe 39 is in communication with vent 43.

A bell-crank 44 has one end engaging valve 40 and the other end pivotally attached to the core of solenoid 45. The other electrical features include a manual cut-off switch 46, a breaker switch 47 and a micro-switch 48, all suitably wired, as illustrated in Fig. 1. The micro-switch 48 is disposed within the U-shaped trough U with its head projecting above the floor of the trough.

The arm 15, pivoted at 17, is provided with spaced adjustable bolts 49 and 50, for engaging circuit breaker arm 51, which is disposed in the path of travel of the bolts.

Referring to the method and operation of the improvements, the embodiment shown in Fig. 1, is illustrated in condition ready for use. In this situation, the slide valve 40 is held to the left, as in Fig. 1, by spring means, not shown, so that the upper chamber of cylinder 36 is vented through pipe 38 and vent 42, while the piston 35 is held in raised illustrated position, due to the valve 40 admitting air pressure to the lower chamber of cylinder 36, through pipes 37 and 39, at which time valve 40 has closed vent 43. Knife 26 on arm 14, and carriage 10 actuated by arm 31, are now in positions illustrated in Figs. 1, 2 and 4. In this condition also, the solenoid 45 is de-energized, the circuit through breaker switch 47 is closed, but the micro-switch 48 is open. The entire operation is controlled by depressing the micro-switch 48 in the bottom of trough U, which closes the electrical circuit through switch 47 and energizes solenoid 45. Thereupon, the bell crank 44 moves clockwise, urging valve 40 to the right, compressing its spring (not shown) so that the lower chamber of cylinder 36 is vented through pipe 39 and vent 43, while air pressure is admitted to the upper chamber of cylinder 36 through pipes 37 and 38. Concurrently, vent 42 is closed.

This series of events causes the lowering of piston rod 34 and the beginning of the retreat to the right in Fig. 1, of carriage 10 and the rocking of arms 14, 15 and 16 in a clockwise direction. As hereinafter described, the parts move from the position of Figs. 1 and 2 into the position shown in Fig. 5, and then to the exaggerated position shown in Fig. 6. When the latter position is reached, bolt 50 on arm 15 engages circuit breaker 51, swings it counter-clockwise in Fig. 1, thereby breaking the circuit and de-energizing the solenoid 45. The spring pressed valve 40 returns to its original illustrated position under the urge of the spring (not shown) and the cylinder 36 is vented in the upper chamber, and air pressure is admitted to the lower chamber, thereby again raising piston 35, and again restoring the parts to the position illustrated in Fig. 1. This reciprocation of the piston 35 and rod 34 occurs in a fraction of a second and actuates arms 16 and 31. To accommodate the arcuate travel of pivot 33 on arm 16 and rod 34, about pivot 17, the cylinder 36 is free to oscillate, i. e., to rock clockwise and counter-clockwise about pivot 36b.

Referring now more particularly to the wrapping and shearing operations, it is noteworthy that the improvements are designed so that these operations are incepted and completed by the work itself, under the manual manipulation of the operator.

Before the present improvements are used, a supply of annular rubber coated beads are obtained from a bead-making or bead creating machine, of which there are several in the patented art. In such machines (which form no part of this invention), the rubber coated wire (usually two and more wires) is fed over a drum and cut into an annular form with the free ends overlapping about six inches. As this annular member, commonly referred to as a tire bead, leaves that machine, its free ends heretofore have been wrapped by hand with a piece of adhesive tape about three-fourths inch in length. It has been found desirable to wrap the exposed free ends of the tire bead, to prevent chafing or injury to the tire into which it is later placed.

In previous practice, as these beads are discharged from the drum into the worker's hands, this wrapping was done by hand and has proved to be very arduous and, in time, impairs the hands of the worker. The present improvements are designed to dispense with the hand-wrapping feature, to triple the number of beads wrapped in a given period, and at the same time serve as a convenient and readily available supplement to the existing annular bead creating machine, so that the latter need not be scrapped.

Accordingly, the embodiment shown in Fig. 1, is adapted for association with such a bead creating machine, so that as a cut annular bead with lapped ends is produced, a worker can grasp it, and immediately feed it to the present improvements for wrapping and subsequent storing. Therefore, the pedestal 1 and associated parts are constructed so that the level of the tape end TE is slightly above the waist level of the worker. This enables him to apply the work to the machine of this invention, while also looking at the work and observing the results of the wrapping and shearing steps.

Figure 8:
Fig. 8 is a detail view showing the lapped portion of the annular bead with the free bead ends wrapped with tape.

In Figs. 3 and 8, only a fragment of the annular bead B is shown. However, the detail of the bead is sufficient to outline the steps in the method and the operation of the improvements.

As the annular bead B comes off the bead creating machine (not shown), the operator seizes it with both hands, on either side of the lapped area. He then locates one end of the bead immediately above the "bridge" formed by the free tape-end TE and directly above the U-shaped mouth or trough U and above micro-switch 48, so that the bead end to be wrapped will be within the tape when wrapped and severed.

The operator now manually lowers the bead to be wrapped, against the "bridge" formed by tape-end TE, carrying the tape along into trough U, until the condition illustrated in Figs. 3 and 4 is reached. As seen in Fig. 4, the bead has not yet engaged micro-switch 48. At the conclusion of this step, the bead B is three-fourths wrapped, and the tape-end TE has assumed a U-shaped contour. Inasmuch as the tape has not yet been severed, there is a "drag" on the tape from both sides of the bead which contributes to a more compact and tight union with the rubber coated bead, producing a slight tension in the tape. This condition insures an initial holding of the lapped portions of the bead, which prevents relative shifting or movement thereof. The next step in the method can, therefore, be undertaken, with the assurance that a tight union has already been initiated in three quarters of the wrapping, and the remaining wrap will complete an efficient and tight closure.

Referring now to the steps illustrated in Figs. 4 and 5, the operator further depresses the work or bead B from the position of Fig. 4 to that of Fig. 5. This movement depresses and holds micro-switch 48 to the bottom of the trough U. As heretofore described, arms 31 and 14 are then moved in a clockwise direction, under about 100 pounds of air pressure. Under the influence of this force, the bar 19 engages and drives the upstanding free end of the tape TE (as seen in Fig. 4) across the upper edge of the bead, thereby completing the wrapping of the bead, and driving the free end of the tape against the corresponding upstanding unsevered tape, as shown in Fig. 5. This force squeezes and holds the tape lapped upon itself, as in a vice, against vertical face 7 of floor 3. In this state, the tape is ready to be cut or sheared. The pressure of bar 19, holding the tape in firm, gripped relation, under tension, facilitates the cutting operation which follows within a fraction of a second.

In this fraction of a second, the parts move from the position of Fig. 5 to that of Fig. 6. In Fig. 6, the relation of parts is exaggerated for the purposes of clarity. This step of shearing or cutting the tape, while held tightly, is accomplished by the arrest of the clockwise movement of bar 19 when encountering the face 7, and by the further clockwise movement of knife 26, relative to bar 19, and against the tape and against face 7. This is permitted by reason of the air pressure which drives arm 14 and knife 26 until the latter engages and severs the tape, in a shearing action against face 7. The parts then take the relation shown in Fig. 6. In this relative movement, the arm 14 and base 20 advance relative to bar 19, by the amount of clearance provided at 22 in Fig. 2. This clearance may be varied, as desired, by manipulating adjusting bolts 25.

Following the above step, the bolt 50 engages arm 51, de-energizing solenoid 45 and the air pressure in the cylinder 36 is reversed as heretofore described. Air released from cylinder 36 through line 38 passes through a one direction speed control valve (not shown, as any conventional type may be used) allowing the knife to return to its original resting position, as illustrated in Fig. 1, at a reduced speed giving the operator time to remove the tire bead before the machine starts through the cycle again. In this development, the springs 24 urge the bar 19 away from base 20, thus again restoring and providing clearance 22, and restoring the bar 19 to its position slightly in front of knife 26 (see Figs. 1 and 4).

The operator then removes the wrapped bead B from the trough U, releasing the micro-switch 48, which again protrudes above the floor of trough U, ready for the next operation. A portion of the wrapped bead is illustrated in Fig. 8, where the tape marked X is shown in the condition after removal of the work from the machine by the operator. The tape marked Y shows the tape after it has been manually pressed on down upon itself in any desired manner from the condition shown at X.

A further operation, which remains to be described, has to do with the feeding of the tape from roll R. When the tape end is disposed in "bridge" form TE, as shown in Figs. 1 and 2, the rod 34, through arm 31, has driven carriage 10 and apron 11 to the limit of its left hand travel. In this position (see Figs. 1, 2 and 4), the carriage 10 has advanced to the face 8 of floor 3, and the apron 11 is disposed above floor 3 and under the tape. When the micro-switch 48 is depressed, the clockwise travel of parts 14, 19 and 26 is synchronized with the clockwise travel of apron 11 and carriage 10, so that these last mentioned parts retreat to the positions shown in Figs. 5 and 7. In doing so, the polished surface of apron 11 slides rearwardly from beneath the tape so that the tape rests on floor 3, while the carriage with teeth 10a retreats to a position ready for return travel.

Upon the subsequent retreat in a counter-clockwise direction of arm 14, with bar 13 and knife 26, the carriage 10 and apron 11 concurrently advance and, due to the grip of teeth 10a and the pressure of roller 12, the tape is advanced about three-quarters of an inch to a position where it forms a new "bridge" over trough U, as seen in Figs. 1 and 2. In this feeding operation, the tape rides forward without difficulty or buckling, due, in part, to the bulk of the tape itself, as well as to the smooth, polished surface of floor 3 and apron 11, which reduces adhesion to a minimum.

In addition to objectives heretofore set forth, the improvements have numerous outstanding advantages. For example, the operator when manually applying the work to the machine, does not have to use his foot on a pedal, or his hand on a lever, to incept the operation, while he is independently manually applying the work. Therefore, the present improvements eliminate the necessity for coordination of activities on the part of the operator and, therefore, does not require the services of a skilled individual. Very little instruction is needed, in order to use the machine with safety. Moreover, as a further safety measure, the operator has the satisfaction of knowing that actuation of the machine is under his own control and that there is no pedal or lever, which other workmen might accidentally actuate, at a time when his hands may be in danger of injury.

Although only one embodiment of the invention has been illustrated, it is understood that the others may be designed for practicing the method and accomplishing the objectives, without departing from the scope of the appended claims.

Having thus described our invention, what we claim is:

1. In a machine for wrapping tire beads, a fixed U-shaped work-receiving trough having an open mouth, means for feeding binding tape across said mouth, a movable tape engaging bar, a tape cutting knife movable with said bar, and control means in said trough responsive to the impact with the work for activating said bar and knife.

2. In a machine for wrapping tire beads, a fixed U-shaped work-receiving trough having an open mouth, means for feeding binding tape across said mouth, a moveable arm, a tape engaging bar on said arm, a tape cutting knife on said arm, and control means in said trough responsive to the impact with the work for activating said arm.

3. In a machine for wrapping tire beads, a U-shaped work-receiving trough having an open mouth, means for feeding binding tape across said mouth, a moveable arm, a tape engaging bar on said arm, a tape cutting knife on said arm, a solenoid, means activated by said solenoid for actuating said arm, and means for energizing said solenoid, including a switch mounted within said trough.

4. In a machine for wrapping tire beads, a U-shaped work-receiving trough having an open mouth, means for feeding binding tape across said mouth, a moveable arm, a tape engaging bar on said arm, a tape cutting knife on said arm, a solenoid, means activated by said solenoid for concurrently actuating said arm and tape feeding means, and means for energizing said solenoid, including a switch disposed in said trough.

5. In a machine for wrapping tire beads, a U-shaped work-receiving trough having an open mouth, a reciprocating tape feeding means, a reciprocating tape cutting means, mechanism common to both said means for initially advancing said feeding means and concurrently retracting said cutting means and thereupon retracting said feeding means and concurrently advancing said cutting means, and means in said trough for activating said mechanism.

6. In a machine for wrapping tire beads, a U-shaped work-receiving trough, having an open mouth, means for feeding binding tape across said mouth, a moveable arm, a tape engaging bar on said arm, a tape cutting knife on said arm, an air-pressure operated piston for actuating said arm, a solenoid controlling the movement of said piston, and means for energizing said solenoid, including a switch disposed within said trough.

7. In a machine for wrapping tire beads, a U-shaped work-receiving trough having an open mouth, means for feeding binding tape across said mouth, said means including an apron for supporting said tape during feeding movement, an arm, a tape engaging bar on said arm, a tape cutting knife on said arm, and control means in said trough responsive to the impact with the work for activating said arm.

8. In a machine for wrapping tire beads, a U-shaped work-receiving trough, said trough including a fixed wall member, a reciprocating arm, a knife fixed to said arm, a tape-engaging bar carried by said arm and associated with said knife, said bar being moveable relative to said knife, and means for advancing said bar into engagement with said wall member, and means for advancing said knife while said bar and wall member are engaged.

9. In a machine for wrapping tire beads, a channel-shaped guideway having a mouth, a U-shaped trough in front and beneath the mouth, a carriage having a toothed surface for feeding a length of tape along said guideway, a pressure bar disposed for movement over said trough, a knife superimposed over said bar, a second carriage supporting said bar and knife, a common source of energy for moving said carriages in unison, and a control member for said energy source disposed within the said U-shaped trough.

10. In a machine for wrapping tire beads, a channel-shaped guideway having a mouth, a U-shaped trough in front and beneath the mouth, a carriage having a toothed surface for feeding a length of tape along said guideway, a pressure bar disposed for movement over said trough, a knife superimposed over said bar, a spring controlled means between said bar and knife for permitting relative movement therebetween, a second carriage supporting said bar and knife, a common source of energy for moving said carriages in unison, and a control member for said energy source disposed within the said U-shaped trough.

11. A machine for wrapping tape about a cylindrical object, comprising an open-mouth trough, a carriage for moving tape over the mouth, a second carriage having wrapping and cutting members for the tape, mechanism for actuating said carriages, and a member within said trough, responsive to pressure for activating said mechanism for successively moving said carriages over said mouth.

12. A machine for wrapping tape about a cylindrical object, comprising an open-mouth trough, a carriage for moving tape in one direction over the mouth, a second carriage moveable in the opposite direction and having wrapping and cutting members for the tape, mechanism for activating said carriages and a member within said trough responsive to pressure for activating said mechanism for moving said carriages.

13. A machine for wrapping tire beads comprising a support, a piston associated with said support, an arm connected with said piston, a tape-feeding device connected with said arm, a second arm connected with said piston, a tape-cutting device on said arm, a source of air pressure for said piston, control means for governing said air pressure, an energy source for actuating said control means, and a releasable switch for said energy source, responsive to contact with the work to be wrapped, for initiating movement of said piston.

14. A machine for wrapping tire beads comprising a support, a piston pivotally associated with said support, an arm connected with said piston, a tape-feeding device connected with said arm, a second arm connected with said piston, a tape-cutting device on said arm, a source of air pressure for said piston, control means for governing said air pressure, an energy source for actuating said control means, and a releasable switch for said energy source, responsive to contact with the work to be wrapped, for initiating movement of said piston.

15. A machine for wrapping tire beads, comprising a support, a piston associated with said support, a tape feeding device, a tape cutting device, means for transmitting movement of said piston to said devices, mechanism for reciprocating said piston, and a control means responsive to contact with the work to be wrapped, for actuating said mechanism.

16. A machine for wrapping tire beads, comprising a support, a tape feeding device, moveably mounted on said support, a tape-cutting device moveably mounted on said support, mechanism for concurrently advancing one device and retracting the other device, power means for actuating said mechanism and a control means responsive to contact with the work to be wrapped, for applying the power means.

17. A machine for wrapping tire beads comprising a support, a piston associated with said support, an arm connected with said piston, a tape-feeding carriage slideably mounted on said support and connected with said arm, a bell-crank lever pivotally mounted on said support having one arm connected with said piston, and the free arm disposed in spaced relation to said carriage, a knife mounted at the free end of said bell crank, conduits for admitting air pressure on both sides of said piston for concurrently moving the carriage and knife, valve means for controlling said conduits, electrical means for actuating said valve, and a switch for said electrical means responsive to contact with the work to be wrapped, for incepting the operation of the device.

18. A machine for wrapping tire beads comprising a support, a piston associated with said support, an arm connected with said piston, a tape-feeding carriage slideably mounted on said support and connected with said arm, a bell-crank lever pivotally mounted on said support having one arm connected with said piston, and the free arm disposed in spaced relation to said carriage, a knife mounted at the free end of said bell crank, a pressure bar protruding beyond said knife and moveable relative to said knife, conduits for admitting air pressure on both sides of said piston for concurrently moving the carriage, bar, and knife, valve means for controlling said conduits, electrical means for actuating said valve, and a switch for said electrical means responsive to contact with the work to be wrapped, for incepting the operation of the device.

19. In a machine for wrapping tire beads, a fixed wall member, a reciprocating arm, a knife fixed to said arm, said knife having its cutting edge facing said wall member, a tape engaging bar carried by said arm, said bar being moveable relative to said knife, and means for advancing said bar into engagement with said wall member, and means for advancing said knife against said wall member while said bar and wall member are engaged.

20. In a machine for wrapping tire beads, a channel shaped guideway having a mouth, a carriage for engaging and feeding a length of tape across said mouth, a fixed wall member depending from said mouth, a pressure bar disposed in spaced relation to said wall member and adapted for movement against said wall member, a knife superimposed over said bar and aligned with said wall member, a second carriage supporting said bar and knife, a source of energy for moving said carriages in unison, and a control member for said energy source.

21. A machine for wrapping tire beads, comprising a movable tape feeding mechanism and a movable tape cutting mechanism directly connected for movement as a unit and disposed in opposed spaced relation, means defining a channel in the area between said mechanisms for supporting a length of tape, and control means mounted in said channel responsive to the pressure by the work to be wrapped for actuating said mechanism.

GUSTAV A. KAEBNICK.
R. DALE PARR.
JAMES L. OTSTOT.

References Cited in the file of this patent
UNITED STATES PATENTS

| Number | Name | Date |
| --- | --- | --- |
| 599,548 | Bosworth | Feb. 22, 1898 |
| 1,262,189 | Froehlich | Apr. 9, 1918 |
| 1,305,342 | De Smith | June 3, 1919 |
| 1,338,291 | Elman | Apr. 27, 1920 |
| 1,513,106 | Gruman | Oct. 28, 1924 |
| 1,633,620 | Alderfer | June 28, 1927 |
| 1,842,185 | Magill | Jan. 19, 1932 |
| 1,944,142 | Abbott | Jan. 16, 1934 |
| 1,956,982 | Denmire | May 1, 1934 |
| 1,981,946 | Collins | Nov. 27, 1934 |
| 2,039,627 | Breth | May 5, 1936 |
| 2,278,533 | Desautels | Apr. 7, 1942 |
| 2,324,745 | Weber | July 20, 1943 |
| 2,346,786 | Radek | Apr. 18, 1944 |
| 2,364,051 | Berridge | Dec. 5, 1944 |
| 2,514,453 | Miller | July 11, 1950 |